US012039324B2

(12) United States Patent
Yu et al.

(10) Patent No.: US 12,039,324 B2
(45) Date of Patent: Jul. 16, 2024

(54) HIGH-PERFORMANCE COMPUTER SYSTEM AND METHOD FOR IMPROVED SOFTWARE EVENT MANAGEMENT

(71) Applicant: SAP SE, Walldorf (DE)

(72) Inventors: Xia Yu, Shagnhai (CN); Guangquan Dai, Shanghai (CN); Wanshun Zhang, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/727,352

(22) Filed: Apr. 22, 2022

(65) Prior Publication Data

US 2023/0342143 A1  Oct. 26, 2023

(51) Int. Cl.
*G06F 8/70* (2018.01)

(52) U.S. Cl.
CPC ....................... *G06F 8/70* (2013.01)

(58) Field of Classification Search
CPC ....................................................... G06F 8/70
USPC .................................................. 717/116–140
See application file for complete search history.

(56) References Cited

U.S. PATENT DOCUMENTS

| 6,408,386 | B1 * | 6/2002 | Hammond | G06F 9/3822 |
| | | | | 712/E9.035 |
| 6,490,574 | B1 * | 12/2002 | Bennett | G06N 5/043 |
| | | | | 706/46 |
| 6,856,350 | B2 * | 2/2005 | Orava | G01T 1/2964 |
| | | | | 348/E3.018 |
| 7,216,336 | B1 * | 5/2007 | Ezra | G06F 11/3624 |
| | | | | 717/124 |
| 7,559,065 | B1 * | 7/2009 | Sosnovsky | G06F 9/542 |
| | | | | 719/318 |
| 7,916,728 | B1 * | 3/2011 | Mimms | H04L 45/54 |
| | | | | 370/395.31 |
| 8,001,232 | B1 * | 8/2011 | Saulpaugh | H04L 63/123 |
| | | | | 709/224 |
| 8,121,973 | B2 * | 2/2012 | Anderson | G06F 11/3447 |
| | | | | 709/224 |
| 8,452,901 | B1 * | 5/2013 | Sandstrom | G06F 11/079 |
| | | | | 710/39 |
| 8,656,350 | B2 * | 2/2014 | Bates | G06Q 10/08 |
| | | | | 717/136 |

(Continued)

OTHER PUBLICATIONS

Krasna, et al, How to Improve the Quality of Software Engineering Project Management, ACM, pp. 1-6 (Year: 1998).*

(Continued)

*Primary Examiner* — Anil Khatri
(74) *Attorney, Agent, or Firm* — SCHWEGMAN LUNDBERG & WOESSNER, P.A.

(57) ABSTRACT

In an example embodiment, to improve performance, a solution is provided that removes the bottleneck associated with a single events table. Specifically, the solution provides for three events tables rather than one table. Two of the three tables are domain event outbox tables that are parallel and equivalent to each other. The third table is a domain event indication table, which records which of the domain event outbox tables is in a serve mode versus a maintain mode. At any point in time, one of the two domain event outbox tables is in serve mode while the other is in maintain mode. Serve mode is used for event insert, update, and query, while maintain mode is used for event purge.

17 Claims, 8 Drawing Sheets

(56) References Cited

U.S. PATENT DOCUMENTS

| | | | | |
|---|---|---|---|---|
| 8,762,951 | B1* | 6/2014 | Kosche | G06F 11/3476 |
| | | | | 717/127 |
| 10,438,164 | B1* | 10/2019 | Xiong | G06F 18/25 |
| 10,498,600 | B2* | 12/2019 | Ramos de Azevedo | |
| | | | | H04L 41/0816 |
| 11,188,642 | B2* | 11/2021 | Singla | H04L 41/22 |
| 11,288,255 | B2* | 3/2022 | Zenger | G06F 16/235 |
| 11,651,149 | B1* | 5/2023 | Miller | G06F 40/174 |
| | | | | 715/823 |
| 2008/0172419 | A1* | 7/2008 | Richards | G06F 16/24569 |
| 2016/0299799 | A1* | 10/2016 | De Smet | G06F 8/4443 |
| 2018/0336351 | A1* | 11/2018 | Jeffries | G06F 21/53 |
| 2020/0396280 | A1* | 12/2020 | Norris | H04L 43/20 |
| 2023/0014255 | A1* | 1/2023 | Beyer | G06Q 10/0875 |

OTHER PUBLICATIONS

Kozlenkov et al, "State Management and Concurrency in Event Processing", ACM, pp. 1-4 (Year: 2009).*

Ebert, "Managing Software Products in a Global Context", ACM, pp. 64-71 (Year: 2018).*

Mankad et al, "Managing Events: The IoT Way", IEEE, pp. 1292-1297 (Year: 2022).*

Volkova et al, "High-Performance Complex Event Processing", IEEE, pp. 1-7 (Year: 2020).*

Higashino et al, "Query Analyzer and Manager for Complex Event Processing as a Service", IEEE, pp. 107-109 (Year: 2014).*

* cited by examiner

HIGH-PERFORMANCE COMPUTER SYSTEM AND METHOD FOR IMPROVED SOFTWARE EVENT MANAGEMENT

TECHNICAL FIELD

This document generally relates to systems and methods for managing huge software events systems. More specifically, this document relates to a high-performance mechanism for huge software events systems.

BACKGROUND

In large cloud environments, there has been a trend towards more and more systems using microservices. A microservices architecture arranges an application as a collection of loosely-coupled services. In microservices architectures, services are fine-grained and protocols are lightweight. Loose coupling reduces dependencies and the complexities around them. Services in a microservice architecture are often processes that communicate over a network to fulfil a goal using technology-agnostic protocols such as HyperText Transfer Protocol (HTTP).

A domain event framework is a communication middleware between different microservices, permitting the communication of events (e.g., database entry updates, inserts, and deletes) among the microservices.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
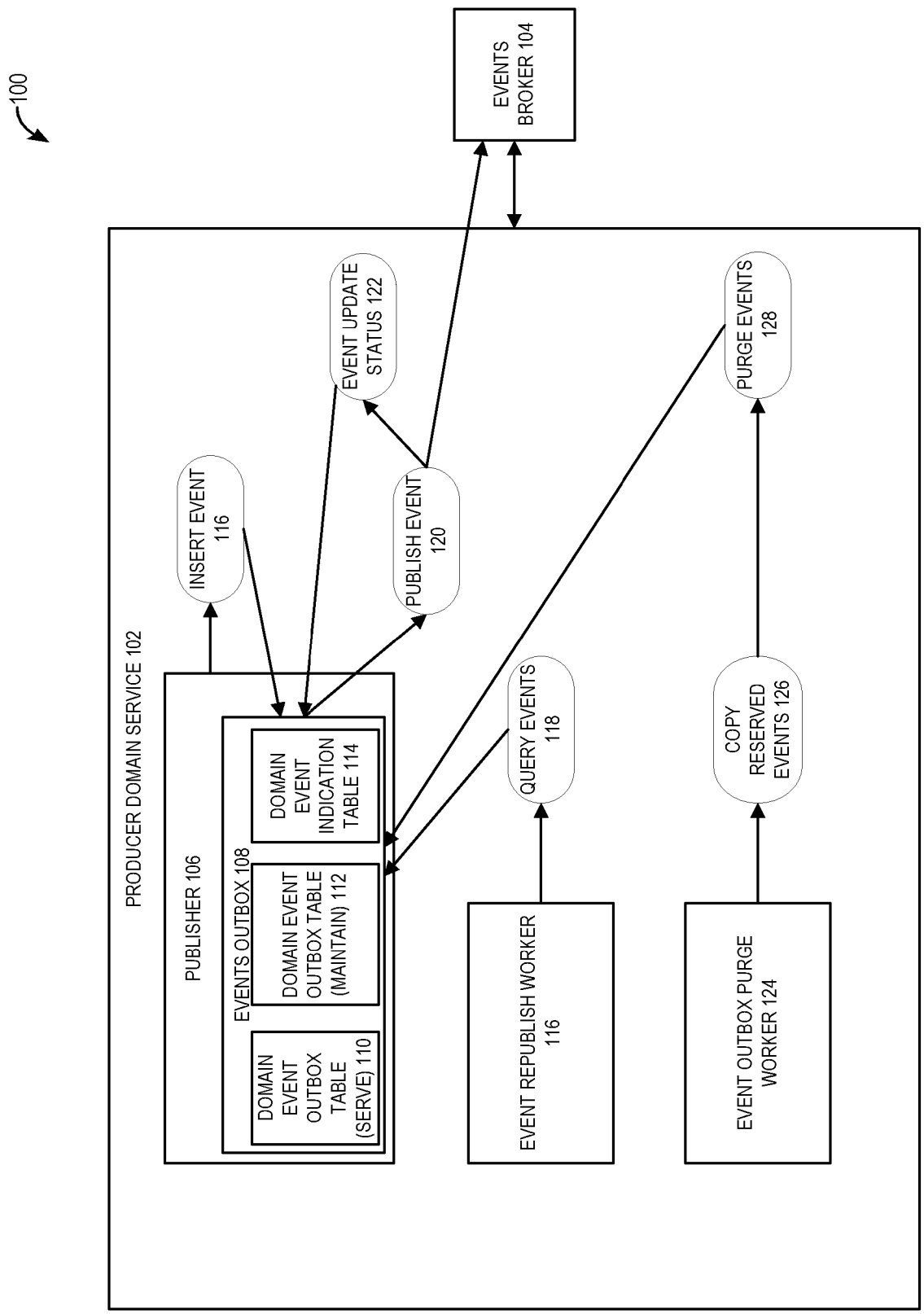
FIG. 1 is an architecture diagram illustrating an events management system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In many microservices architectures, events are used to exchange and update data between loosely linked microservices. In some cases, a set of microservices will share the same stack and in other cases a set of microservices will have different stacks. As an example, there may be a microservice such as User Account that stores data about a particular user such as name, address, phone number, email address and payment information (e.g., credit card number). Another microservice would be Place Order. As the User Account and Place Order microservices are loosely coupled, they do not have a direct linkage between them but instead complete tasks by sharing data using events.

In such cases, messages or events are published when a change is determined by a particular microservice. As that event is published, other microservices that are subscribed to that event and/or publisher are sent the event. In some cases, the receipt of the event by the other microservices in turn cause those microservices to publish other events. Following this basic example, when an order of goods is placed using the Place Order microservice, an event is published indicating that a new order has been placed. The User Account microservice subscribes to events from Place Order and will in turn publish an event that includes the relevant data from a particular user in response. The Place Order microservice, being a subscriber of User Account, will then obtain the data it needs, e.g., name, mailing address, etc., in order to fulfill the order of goods by the user.

As the number of services in a microservices architecture increases, the number of events also increase. Therefore the number of events that are published to accomplish tasks increases.

Typically, all of this event data is stored in a single database table called an events table. Various types of actions can be taken on the event table, such as inserting an event into the event table, updating an event that is in the event table, querying an event in the event table, and deleting or purging the event/events in the event table. At certain points unpublished events in the events table are then published. As the number of insert/update/query/delete event actions increases, however, this table can become a bottleneck, and event process performance is worsened. This decreased performance can arise in increased wait times as a later-in-time event must wait until the events issued earlier in time are completed. The larger the number of actions triggering events table changes increases that wait time. This can be especially problematic if administrative changes to the events table are causing user-initiated changes to be delayed in execution.

In an example embodiment, a solution is provided that removes the bottleneck associated with a single events table to improve performance. Specifically, the solution provides for three tables rather than one events table. Two of the three tables are two domain event outbox tables that are parallel and equivalent to each other. The third table is a domain event indication table, which records which of the domain event outbox tables is in a serve mode versus a maintain mode. At any point in time, one of the two domain event outbox tables is in serve mode while the other is in maintain mode. Serve mode is used for user-initiated event insert, update, query, and delete while maintain mode is used for administrative events such as a purge (where the system deletes out of date events). In addition, the triggering of when to switch modes of the tables is also important. In some implementations, switching the tables at every event uses resources unnecessarily. A more efficient approach that does not cause performance delays is to switch tables from serve mode to maintain mode, and vice versa, at a particular time interval or action, such as a purge event, that keeps the tables up to date without sacrificing performance or in creating larger audit logs that are also cumbersome to use.

The solution described herein may be implemented in a microservices architecture, although one of ordinary skill in the art will recognize that it may also be used in other types of architectures. Hence, the present document shall be interpreted in a way that the solution applies to any type of architecture and should only be limited to microservices architectures when expressly recited.

Additionally, the present solution is described in terms of domain events. A domain event is an event that is spawned from a domain model and a result of a decision within the domain. A domain model is a model that is valid within a bounded context. Nevertheless, the solution may be applied to events other than domain events as well.

When a purge task is triggered, the modes of the two domain event outbox tables are swapped (i.e., the domain event outbox table in maintain mode is switched to serve mode while the domain event outbox table in serve mode is switched to maintain mode), and then events that are unfinished or created within a preset time period (e.g., the last three days) are copied from the recently designated maintain mode table to the recently designated serve mode table. Once the events have finished being copied, the purge task truncates the table now in maintain mode.

FIG. 1 is an architecture diagram illustrating an events management system 100, in accordance with an example embodiment. Events management system 100 includes a producer domain service 102 and an events broker 104. Events broker 104 acts to send published events to corresponding services/users that have subscribed to receive the published events. The producer domain service 102 acts to generate user-initiated and administrative events that are to be published, updated or purged from the domain and also to perform various activities regarding the events. The producer domain service 102 includes a publisher 106 with an events outbox 108. As described earlier, the events outbox 108 contains a domain event outbox table 110 set to serve mode, a domain event outbox table 112 set to maintain mode, and a domain event indication table 114. The publisher 106 acts to insert an event (via the insert event action 116) in an events table, which, rather than being inserted into a single events table, involves the usage of the domain event outbox table 110 set to maintain mode and domain event outbox table 112 set to maintain mode, as will be described in more detail later. Most of the inserted events would be user-initiated events to accomplish a task.

The producer domain service 102 also contains an event republish worker 116 that acts to query events (the query events action 118) in the events table, again represented by the domain event outbox table 110 set to maintain mode and domain event outbox table 112 set to maintain mode. The query events action 118 may be used, for example, as a precursor to an action to publish or republish an event (e.g., to ensure that the event is in the events table and determine whether it has been published). Events in the events table can also be published via the publish action 120 and have their corresponding event status updated (by event update status action 122) by the producer domain service 102.

The producer domain service 102 also contains an event outbox purge worker 124, which acts to copy reserved events (via the copy reserved events action 126) from the recently selected domain event outbox table 118 in maintain mode to the recently selected domain event outbox table 116 in serve mode and then purge events (via the purge events action 128) from the recently selected domain event outbox table 118 in maintain mode, when necessary.

Table 1 below is an example of a domain event outbox table, in accordance with an example embodiment. This example may be used for both the domain event outbox tables, as they are, as described earlier, parallel and equivalent to each other. One may be titled "DOMAIN_EVENT_OUTBOX_A" and the other may be titled "DOMAIN_EVENT_OUTBOX_B."

TABLE 1

| Column | Type | Not null | Comment |
|---|---|---|---|
| USER_UUID | VARCHAR(256) | | |
| TRACE_PARENT | VARCHAR(256) | | |
| TOPIC | VARCHAR(256) | True | |
| STATUS | VARCHAR(256) | True | |
| RETRY_COUNT | INTEGER | True | |
| PAYLOAD | BLOB | | |
| LAST_MODIFIED_DATETIME | TIMESTAMP | True | |
| ID | VARCHAR(256) | True | Key |
| ERROR_DETAILS | VARCHAR(256) | | |
| CREATED_DATETIME | TIMESTAMP | True | |

Table 2 below is an example of a domain event indication table, in accordance with an example embodiment.

| Column | Type | Not null | Comment |
|---|---|---|---|
| TYPE | INTEGER | True | Key, 0 for table DOMAIN_EVENT_OUTBOX in serve mode, 1 for table DOMAIN_EVENT_OUTBOX_B in serve mode |
| TABLE_NAME | VARCHAR(256) | True | |
| CREATED_DATETIME | TIMESTAMP | True | |
| LAST_MODIFIED_DATETIME | TIMESTAMP | True | |

As can be seen, the domain event indication table is able to record which domain event outbox table is in serve mode. The other table will be in maintain mode. One of the domain event outbox tables may be selected as a default domain event outbox table, which will be considered to be in serve mode at the beginning of the processes described herein.

A series of processes are then used to handle various types of events. The operations of these processes differs based on whether the event is the first event being handled or if the event is a later event. The processes utilized when the event being processed is the first event may be collectively known as the system warm-up workflow, while the processes utilized when the event being processed is a later event may be known as main workflows. This warmup can occur when a system first comes online, or after the event table(s) have been completely purged. Whatever the reason, the warm-up phase occurs when an event is to be inserted to otherwise empty (but at least initialized) event table(s).

Figure 2:
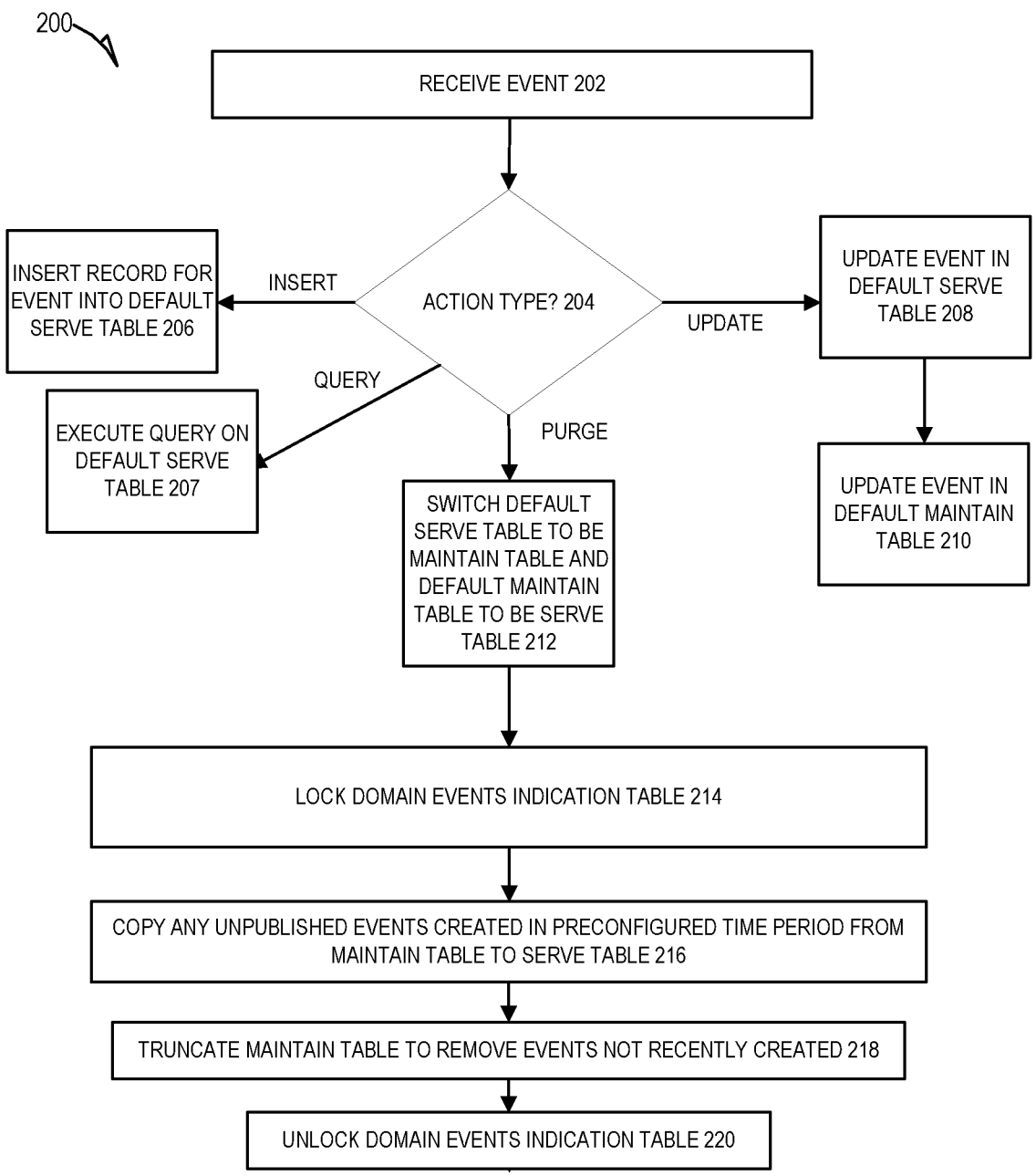
FIG. 2 is a flow diagram illustrating a method of performing a system warm-up workflow in an events management system, in accordance with an example embodiment.

FIG. 2 is a flow diagram illustrating a method 200 of performing a system warm-up workflow in an events system, in accordance with an example embodiment. At operation 202, an event is received. At operation 204, it is determined the action type being performed on the event. There are four options: insert event, update event, query event, and purge event. If it is an insert event action, then at operation 206, a record for the event is inserted into the default serve table. If it is a query event action, then at operation 207 the query is executed on the default serve table. If it is an update event action, to save the time of synchronizing data between the serve table and the maintain table, the event is updated to both tables. Thus, at operation 208, a record in the default serve table is updated while at operation 210, an identical record in the maintain table is updated.

If it is a purge event action, then at operation 212, the default serve table is switched to be the maintain table, while the maintain table is switched to be the serve table. Then, at operation 214, a domain events indication table is locked. This prevents the serve table and maintenance tables from switching until the next purge event is received. At operation 216, any unpublished events created in a preconfigured time period (e.g., last X days) are copied from the maintain table to the serve table. This synchronizes the data in the maintain table and serve table. While not pictured, a republish worker can then scan the serve table and republish any unpublished events. Republishing may occur if an initial publish action is unsuccessful for some reason. After republishing is successful, those previously unpublished events may be marked as published. Then, at operation 218, the maintain table is truncated to remove events not recently created (e.g., created more than one day ago). Finally, at operation 220, the domain events indication table is unlocked.

Figure 3:
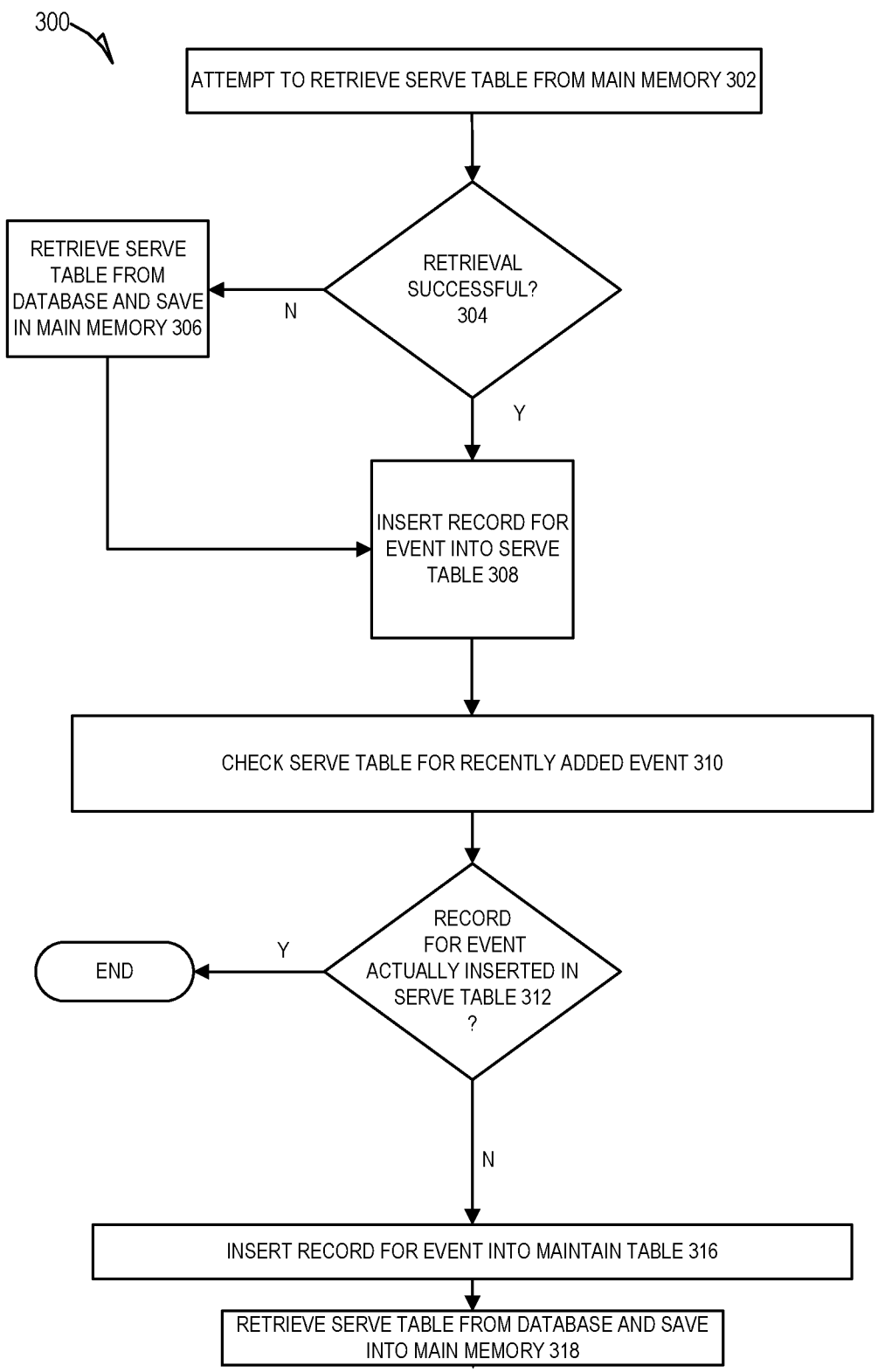
FIG. 3 is a flow diagram illustrating a method of performing a main event workflow for an insert event, in accordance with an example embodiment.

FIG. 3 is a flow diagram illustrating a method 300 of performing a main event workflow for an insert event, in accordance with an example embodiment. The method 300 begins with a series of optional steps. Specifically, in an optional example embodiment, to improve performance, the serve table is cached in main memory. Thus, at operation 302, an attempt to retrieve the serve table from main memory is made. At operation 304, it is determined if this attempt was successful. If not, then at operation 306, the serve table is retrieved from a database and saved into main memory.

At operation 308, a record for the event is inserted into the serve table. It should be noted that since the events coming in are asynchronous, it is possible that the serve table may be changed by a purge event at the same time that the insert event is being processed. As such, a check is then performed to avoid missing any insert event. Thus, at operation 310, the serve table is checked for the recently inserted event. At operation 312, it is determined if the record for the event was actually inserted in the serve table. If so, the method 300 ends. If not, then at operation 314, the record for the event is inserted into the maintain table. Then, at operation 316, the maintain table is copied to the serve table and saved into main memory (thus capturing the version of the serve table on which the simultaneous purge event was processed).

Figure 4:
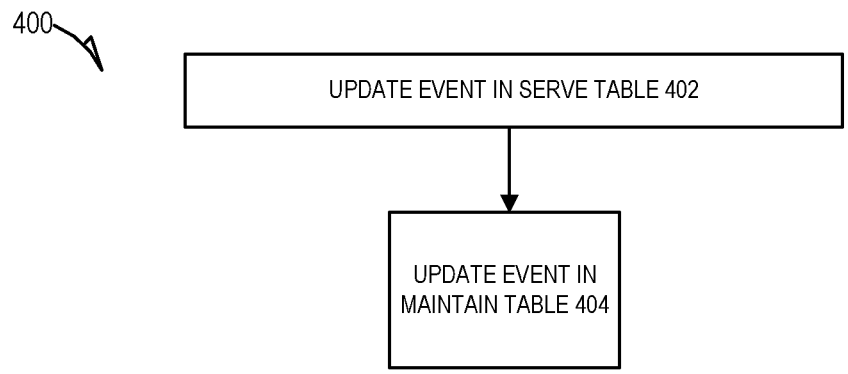
FIG. 4 is a flow diagram illustrating a method of performing a main event workflow for an update event, in accordance with an example embodiment.

FIG. 4 is a flow diagram illustrating a method 400 of performing a main event workflow for an update event, in accordance with an example embodiment. To reduce the difference between the serve table and the maintain table while saving the time of copying data from one table to another, when an update event is encountered, both the serve table and the maintain table are updated. Thus, at operation 402, the event is updated in the serve table, and at operation 404, the event is updated in the maintain table.

Figure 5:
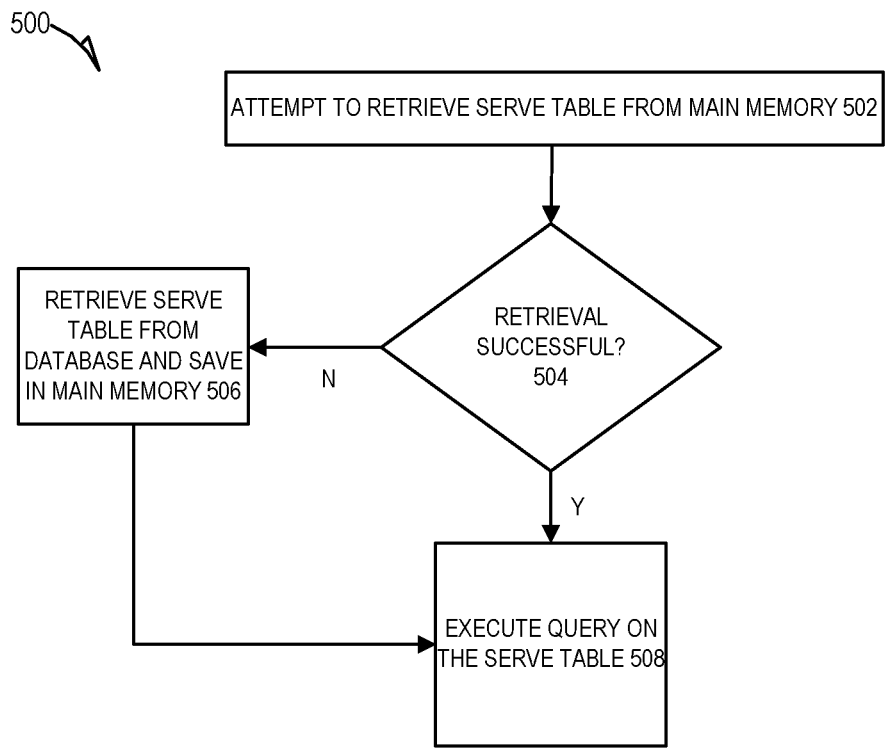
FIG. 5 is a flow diagram illustrating a method of performing a main event workflow for a query event, in accordance with an example embodiment.

FIG. 5 is a flow diagram illustrating a method 500 of performing a main event workflow for a query event, in accordance with an example embodiment. Here, the query event will go to the serve table. Thus, as mentioned before, optionally, at operation 502, an attempt to retrieve the serve table from main memory is made. At operation 504, it is determined if this attempt was successful. If not, then at operation 506, the serve table is retrieved from a database and saved into main memory. Then, at operation 508, the query corresponding to the query event action is executed on the serve table.

Figure 6:
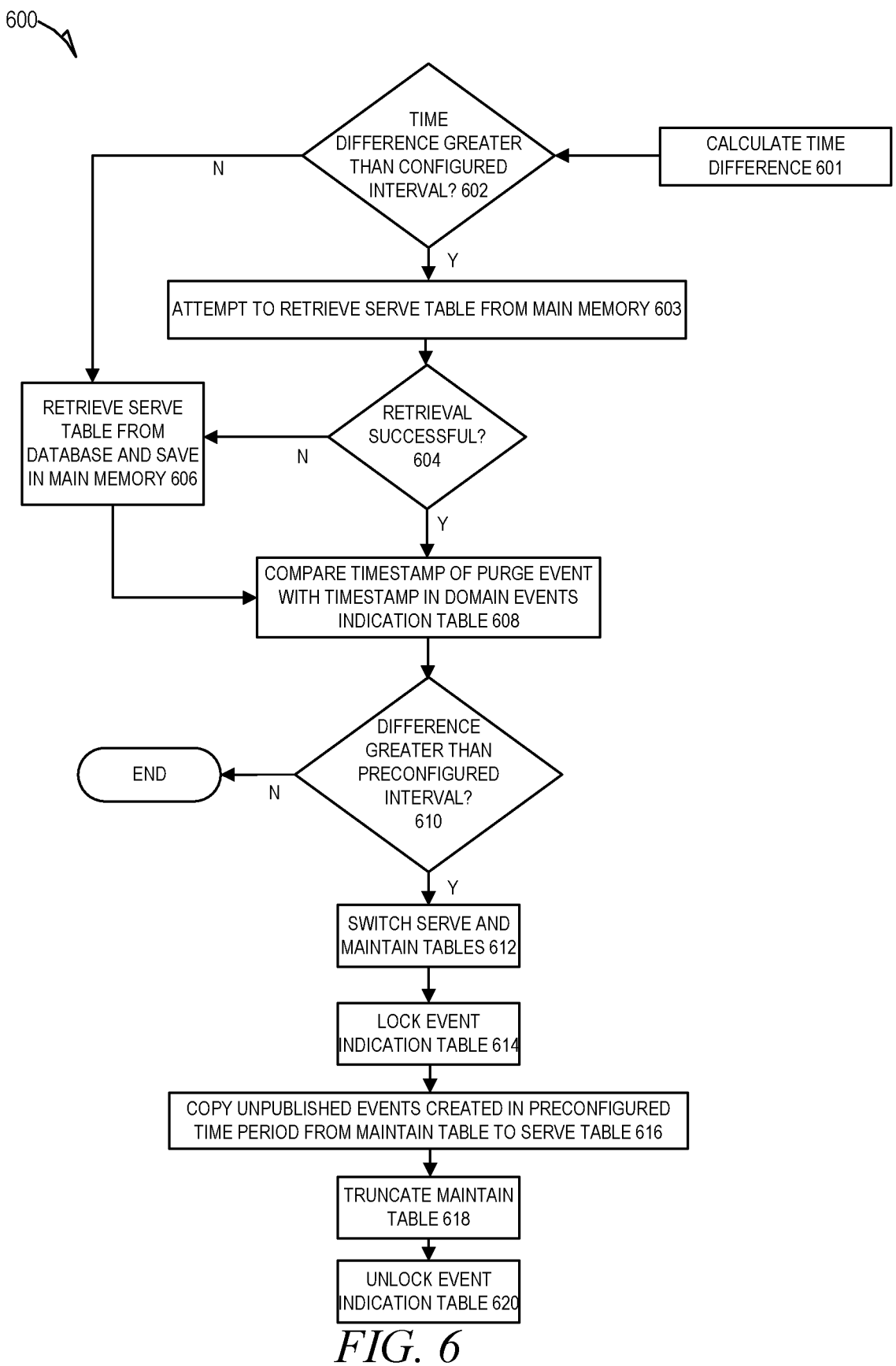
FIG. 6 is a flow diagram illustrating a method of performing a main event workflow for a purge event, in accordance with an example embodiment.

FIG. 6 is a flow diagram illustrating a method 600 of performing a main event workflow for a purge event, in accordance with an example embodiment. There may be a system configuration setting for purge events intervals, for example 12 hours. This indicates that purge events should occur no earlier than the specified interval. When a purge event action is received, at operation 601 the system calculates the time difference between the current and last modified time in the domain events indication table. If, at operation 602, the time difference is greater than the configured interval, the process may proceed. If not, it ends.

Optionally at operation 603 an attempt to access the serve table from main memory is made. At operation 604, it is determined if this access was successful. If not, then at operation 606, the serve table is retrieved from a database and saved into main memory.

At operation 608, a timestamp of the purge event is compared with a timestamp in the domain events indication table (indicative of the timestamp of the previous purge event). At operation 610, it is determined if the difference between the timestamps is greater than a preconfigured interval. If not, then the method 600 ends. If so, however, then at operation 612, the serve table and maintain table are switched (i.e., the domain event outbox table designated as the serve table is changed to be designated as the maintain table and the domain event outbox table designated as the maintain table is changed to be designated as the serve table).

Then, at operation 614, the domain event indication table is locked. At operation 616, any unpublished events created in a preconfigured time period (e.g., last X days) are copied from the maintain table to the serve table. This synchronizes the data in the maintain table and serve table. Then, at operation 618, the maintain table is truncated to remove any events not recently created (e.g., older than one day). Finally, at operation 620, the domain events indication table is unlocked.

Various variables of the above-described solution may be set explicitly by an administrator or may be learned by a computer system via machine learning. Specifically, variables such as the purge interval and preconfigured time period may be learned by passing training data to a machine-learning algorithm to train a machine-learned model to predict an optimal value for the corresponding variable, based on labels assigned to the training data. The machine-learning algorithm may iterate among various parameters, changing parameters (weights) multiplied by various input variables and evaluating a loss function at each iteration, until the loss function is minimized, at which stage the parameters for that stage are learned. The past execution training data may include manually labeled data. Specifically, the weights are multiplied by the input variables as part of a weighted sum operation, and the weighted sum operation is used by the loss function.

The machine-learning algorithm may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

The machine-learned models can also be retrained by passing new training data, some of which may have been labeled via user feedback, to the machine-learning algorithm at a later time.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations for using two event outbox tables, comprising:
designating one outbox table as being in a serve mode and one outbox table as being in a maintain mode;
storing the designations in an event indication table;
in response to receiving a request to insert a first event in an event outbox table:
identifying which event outbox table is identified in the event indication table as being in serve mode; and
inserting a record corresponding to the first event in the event outbox table identified as being in serve mode;
in response to receiving a request to purge an event outbox table:
swapping the designations in the event indication table so that the event outbox table identified as being in serve mode is designated as being in maintain mode and the event outbox table identified as being in maintain mode is designated as being in serve mode;
locking the event indication table;
copying one or more unpublished events from the event outbox table identified as being in maintain mode to the event outbox table identified as being in serve mode;
truncating the event outbox table identified as being in maintain mode; and
unlocking the event indication table.

Example 2. The system of Example 1, wherein the copying further includes only copying unpublished events that have been created within a predetermined time period.

Example 3. The system of Example 2, wherein the truncating includes purging records for any event not created within the predetermined time period.

Example 4. The system of any of Examples 1-3, wherein the swapping, locking, copying, truncating, and unlocking are only performed if a timestamp of a previous purge event in the event indication table is such that a difference in time between the timestamp and a current time is greater than a preconfigured duration.

Example 5. The system of any of Examples 1-4, wherein the operations further comprise, in response to receiving a request to purge an event outbox table and prior to the swapping:
attempting to retrieve the event outbox table identified as being in serve mode from main memory; and
in response to the attempt to retrieve the event outbox table failing, copying the event outbox table identified as being in serve mode from a database to main memory.

Example 6. The system of any of Examples 1-5, wherein the operations further comprise:
in response to receiving a request to query for an event:
performing the query on the event outbox table identified as being in serve mode.

Example 7. The system of any of Examples 1-6, wherein the operations are performed in a microservices architecture.

Example 8. A method for using two event outbox tables, comprising:
designating one outbox table as being in a serve mode and one outbox table as being in a maintain mode;
storing the designations in an event indication table;
in response to receiving a request to insert a first event in an event outbox table:
identifying which event outbox table is identified in the event indication table as being in serve mode; and
inserting a record corresponding to the first event in the event outbox table identified as being in serve mode;
in response to receiving a request to purge an event outbox table:
swapping the designations in the event indication table so that the event outbox table identified as being in serve mode is designated as being in maintain mode and the event outbox table identified as being in maintain mode is designated as being in serve mode;
locking the event indication table;
copying one or more unpublished events from the event outbox table identified as being in maintain mode to the event outbox table identified as being in serve mode;
truncating the event outbox table identified as being in maintain mode; and
unlocking the event indication table.

Example 9. The method of Example 8, wherein the copying further includes only copying unpublished events that have been created within a predetermined time period.

Example 10. The method of Example 9, wherein the truncating includes purging records for any event not created within the predetermined time period.

Example 11. The method of any of Examples 8-10, wherein the swapping, locking, copying, truncating, and unlocking are only performed if a timestamp of a previous purge event in the event indication table is such that a difference in time between the timestamp and a current time is greater than a preconfigured duration.

Example 12. The method of any of Examples 8-11, further comprising, in response to receiving a request to purge an event outbox table and prior to the swapping:

attempting to retrieve the event outbox table identified as being in serve mode from main memory; and
in response to the attempt to retrieve the event outbox table failing, copying the event outbox table identified as being in serve mode from a database to main memory.

Example 13. The method of any of Examples 8-12, further comprising:
in response to receiving a request to query for an event:
performing the query on the event outbox table identified as being in serve mode.

Example 14. The method of any of Examples 8-13, wherein the operations are performed in a microservices architecture.

Example 15. A non-transitory machine-readable medium storing instructions which, when executed by one or more processors, cause the one or more processors to perform operations for using two event outbox tables comprising:
designating one outbox table as being in a serve mode and one outbox table as being in a maintain mode;
storing the designations in an event indication table;
in response to receiving a request to insert a first event in an event outbox table:
identifying which event outbox table is identified in the event indication table as being in serve mode; and
inserting a record corresponding to the first event in the event outbox table identified as being in serve mode;
in response to receiving a request to purge an event outbox table:
swapping the designations in the event indication table so that the event outbox table identified as being in serve mode is designated as being in maintain mode and the event outbox table identified as being in maintain mode is designated as being in serve mode;
locking the event indication table;
copying one or more unpublished events from the event outbox table identified as being in maintain mode to the event outbox table identified as being in serve mode;
truncating the event outbox table identified as being in maintain mode; and
unlocking the event indication table.

Example 16. The non-transitory machine-readable medium of Example 15, wherein the copying further includes only copying unpublished events that have been created within a predetermined time period.

Example 17. The non-transitory machine-readable medium of Example 16, wherein the truncating includes purging records for any event not created within the predetermined time period.

Example 18. The non-transitory machine-readable medium of any of Examples 15-17, wherein the swapping, locking, copying, truncating, and unlocking are only performed if a timestamp of a previous purge event in the event indication table is such that a difference in time between the timestamp and a current time is greater than a preconfigured duration.

Example 19. The non-transitory machine-readable medium of any of Examples 15-18, wherein the operations further comprise, in response to receiving a request to purge an event outbox table and prior to the swapping:
attempting to retrieve the event outbox table identified as being in serve mode from main memory; and
in response to the attempt to retrieve the event outbox table failing, copying the event outbox table identified as being in serve mode from a database to main memory.

Example 20. The non-transitory machine-readable medium of any of Examples 15-19, wherein the operations further comprise:
in response to receiving a request to query for an event:
performing the query on the event outbox table identified as being in serve mode.

Figure 7:
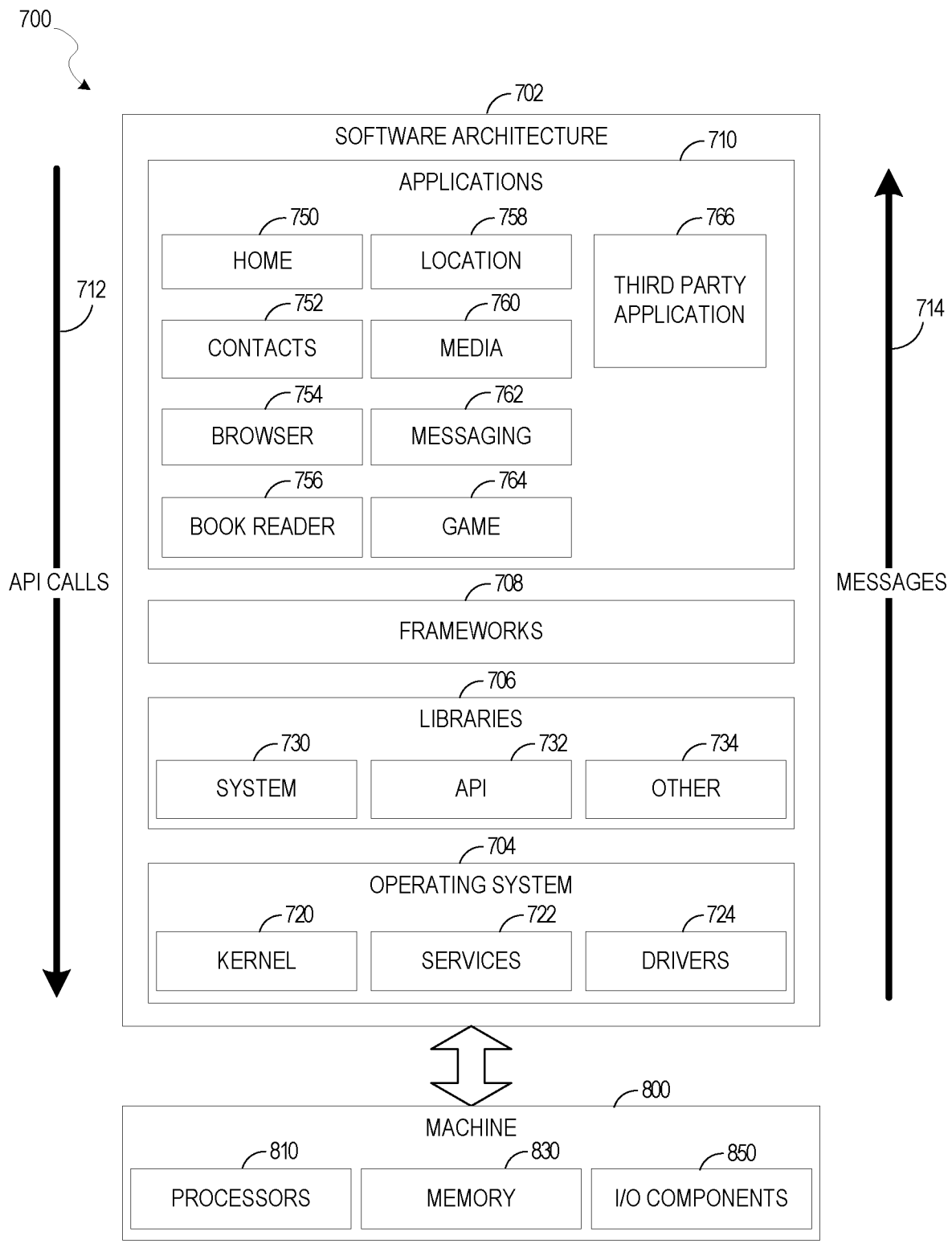
FIG. 7 is a block diagram illustrating an architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke Application Program Interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710. For example, the frameworks 708 provide various graphical user interface functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. The applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 766 can invoke the API calls 712 provided by the operating system 704 to facilitate functionality described herein.

Figure 8:
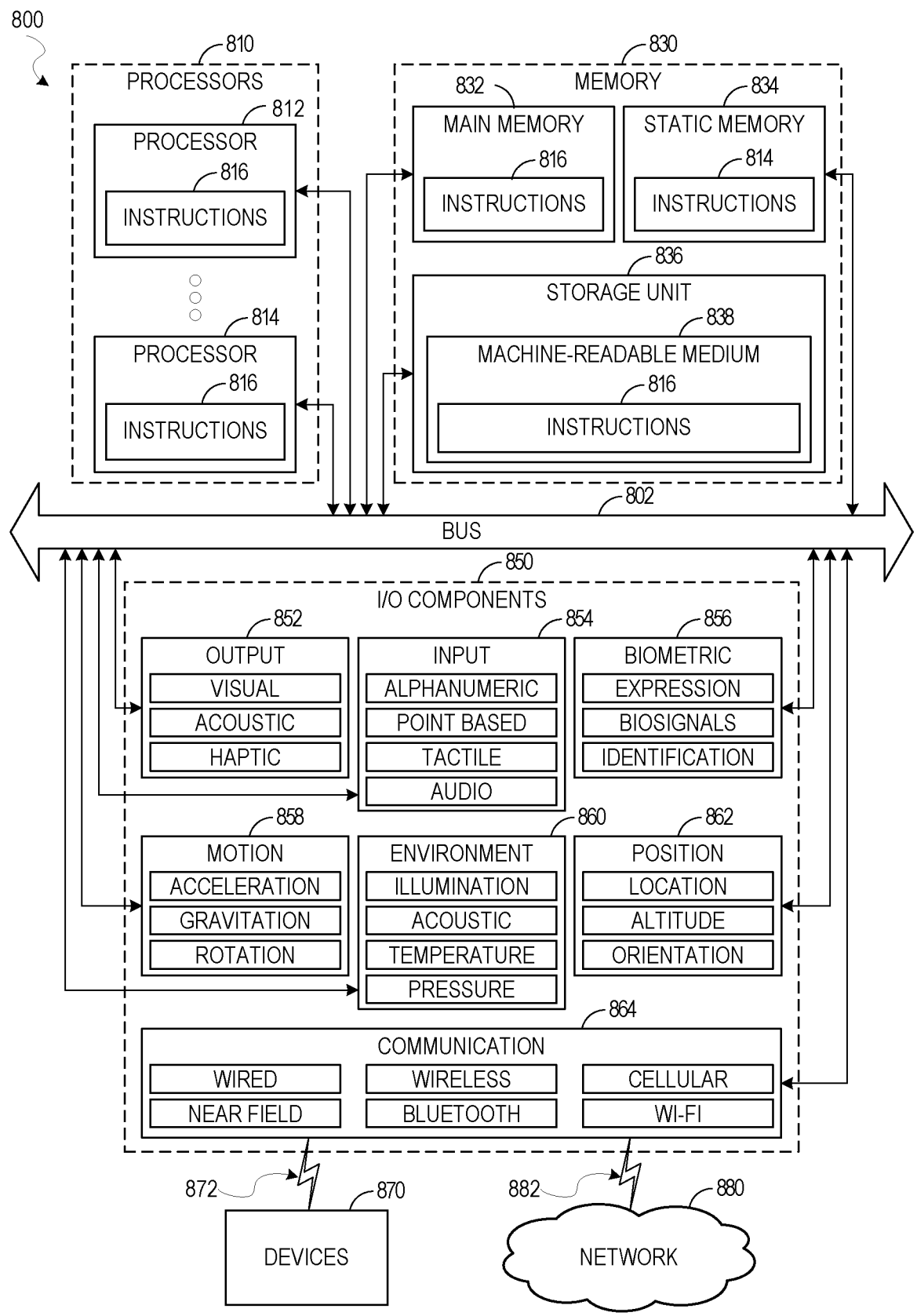
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the methods of FIGS. 2-6. Additionally, or alternatively, the instructions 816 may implement FIGS. 1-6 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 7G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 780 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations comprising:
designating a first event outbox table as being in a serve mode and a second event outbox table as being in a maintain mode;
storing the designations in an event indication table; and
in response to receiving a request to insert a first event in an event outbox table:
identifying which event outbox table is identified in the event indication table as being in serve mode; and
inserting a record corresponding to the first event in the event outbox table identified as being in serve mode;
in response to receiving a request to purge an event outbox table:
swapping the designations in the event indication table so that the event outbox table identified as being in serve mode is designated as being in maintain mode and the event outbox table identified as being in maintain mode is designated as being in serve mode;
locking the event indication table;
copying one or more unpublished events from the event outbox table identified as being in maintain mode to the event outbox table identified as being in serve mode;
truncating the event outbox table identified as being in maintain mode to delete entries from the event output table identified as being in maintain mode; and
unlocking the event indication table;
in response to receiving a request to query for an event:
performing the query on the event outbox table identified as being in serve mode.

2. The system of claim 1, wherein the copying further includes only copying unpublished events that have been created within a predetermined time period.

3. The system of claim 2, wherein the truncating includes purging records for any event not created within the predetermined time period.

4. The system of claim 1, wherein the swapping, locking, copying, truncating, and unlocking are only performed if a timestamp of a previous purge event in the event indication table is such that a difference in time between the timestamp and a current time is greater than a preconfigured duration.

5. The system of claim 1, wherein the operations further comprise, in response to receiving a request to purge an event outbox table and prior to the swapping:
attempting to retrieve the event outbox table identified as being in serve mode from main memory; and
in response to the attempt to retrieve the event outbox table failing, copying the event outbox table identified as being in serve mode from a database to main memory.

6. The system of claim 1, wherein the operations are performed in a microservices architecture.

7. A method comprising:
designating a first event outbox table as being in a serve mode and a second
event outbox table as being in a maintain mode;
storing the designations in an event indication table; and
in response to receiving a request to insert a first event in an event outbox table:
identifying which event outbox table is identified in the event indication table as being in serve mode; and
inserting a record corresponding to the first event in the event outbox table identified as being in serve mode;
in response to receiving a request to purge an event outbox table:
swapping the designations in the event indication table so that the event outbox table identified as being in serve mode is designated as being in maintain mode and the event outbox table identified as being in maintain mode is designated as being in serve mode;
locking the event indication table;
copying one or more unpublished events from the event outbox table identified as being in maintain mode to the event outbox table identified as being in serve mode;
truncating the event outbox table identified as being in maintain mode to delete entries from the event output table identified as being in maintain mode; and
unlocking the event indication table;
in response to receiving a request to query for an event:
performing the query on the event outbox table identified as being in serve mode.

8. The method of claim 7, wherein the copying further includes only copying unpublished events that have been created within a predetermined time period.

9. The method of claim 8, wherein the truncating includes purging records for any event not created within the predetermined time period.

10. The method of claim 7, wherein the swapping, locking, copying, truncating, and unlocking are only performed if a timestamp of a previous purge event in the event indication table is such that a difference in time between the timestamp and a current time is greater than a preconfigured duration.

11. The method of claim 7, further comprising, in response to receiving a request to purge an event outbox table and prior to the swapping:
attempting to retrieve the event outbox table identified as being in serve mode from main memory; and
in response to the attempt to retrieve the event outbox table failing, copying the event outbox table identified as being in serve mode from a database to main memory.

12. The method of claim 7, wherein the method is performed in a microservices architecture.

13. A non-transitory machine-readable medium storing instructions which, when executed by one or more processors, cause the one or more processors to perform operations comprising:

designating a first event outbox table as being in a serve mode and a second event outbox table as being in a maintain mode;

storing the designations in an event indication table; and in response to receiving a request to insert a first event in an event outbox table:

identifying which event outbox table is identified in the event indication table as being in serve mode; and inserting a record corresponding to the first event in the event outbox table identified as being in serve mode;

in response to receiving a request to purge an event outbox table:

swapping the designations in the event indication table so that the event outbox table identified as being in serve mode is designated as being in maintain mode and the event outbox table identified as being in maintain mode is designated as being in serve mode;

locking the event indication table;

copying one or more unpublished events from the event outbox table identified as being in maintain mode to the event outbox table identified as being in serve mode;

truncating the event outbox table identified as being in maintain mode to delete entries from the event output table identified as being in maintain mode; and unlocking the event indication table;

in response to receiving a request to query for an event:

performing the query on the event outbox table identified as being in serve mode.

14. The non-transitory machine-readable medium of claim 13, wherein the copying further includes only copying unpublished events that have been created within a predetermined time period.

15. The non-transitory machine-readable medium of claim 14, wherein the truncating includes purging records for any event not created within the predetermined time period.

16. The non-transitory machine-readable medium of claim 13, wherein the swapping, locking, copying, truncating, and unlocking are only performed if a timestamp of a previous purge event in the event indication table is such that a difference in time between the timestamp and a current time is greater than a preconfigured duration.

17. The non-transitory machine-readable medium of claim 13, wherein the operations further comprise:

in response to receiving a request to query for an event:

performing the query on the event outbox table identified as being in serve mode.

\* \* \* \* \*